Aug. 17, 1965    W. H. P. POULIART ETAL    3,201,758
ELECTRICAL SORTING SYSTEM
Filed April 13, 1959    5 Sheets-Sheet 1
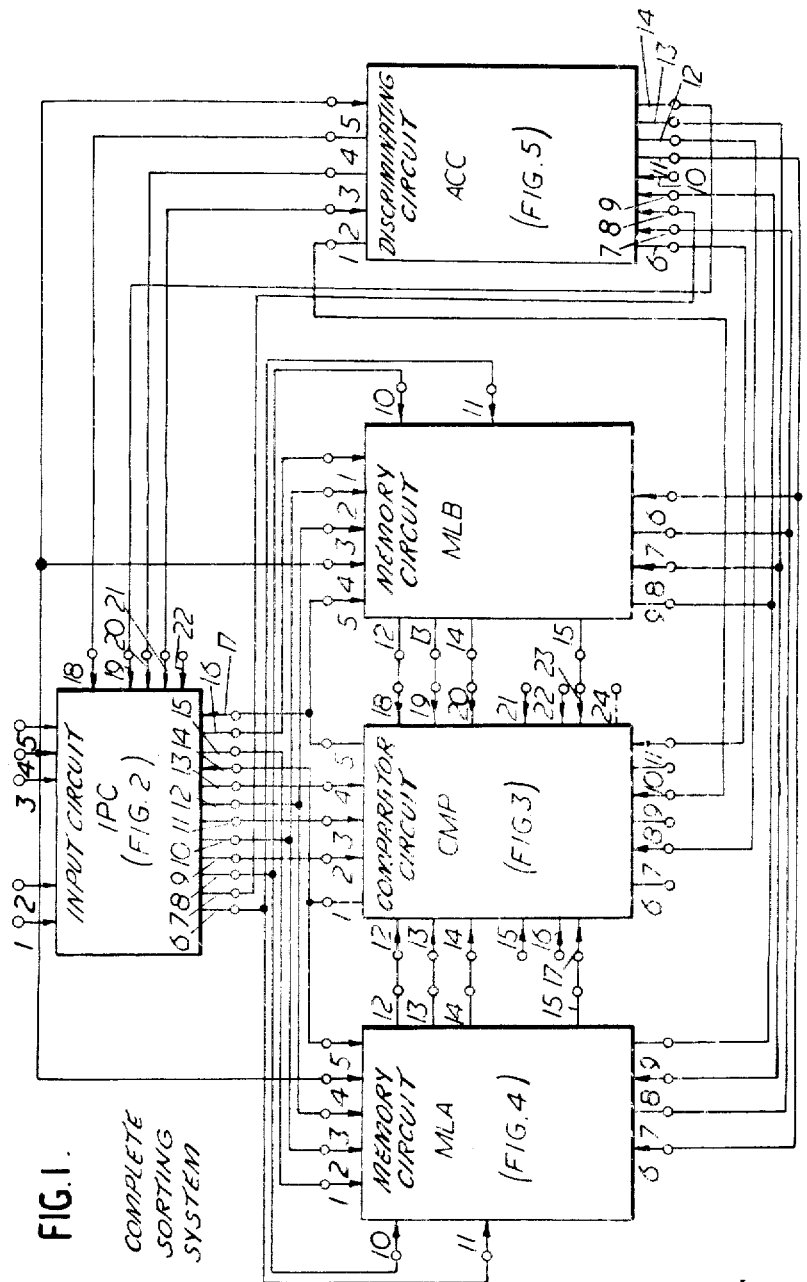
Inventor
W.H.P. POULIART -
G. VAN MECHELEN
By
Attorney

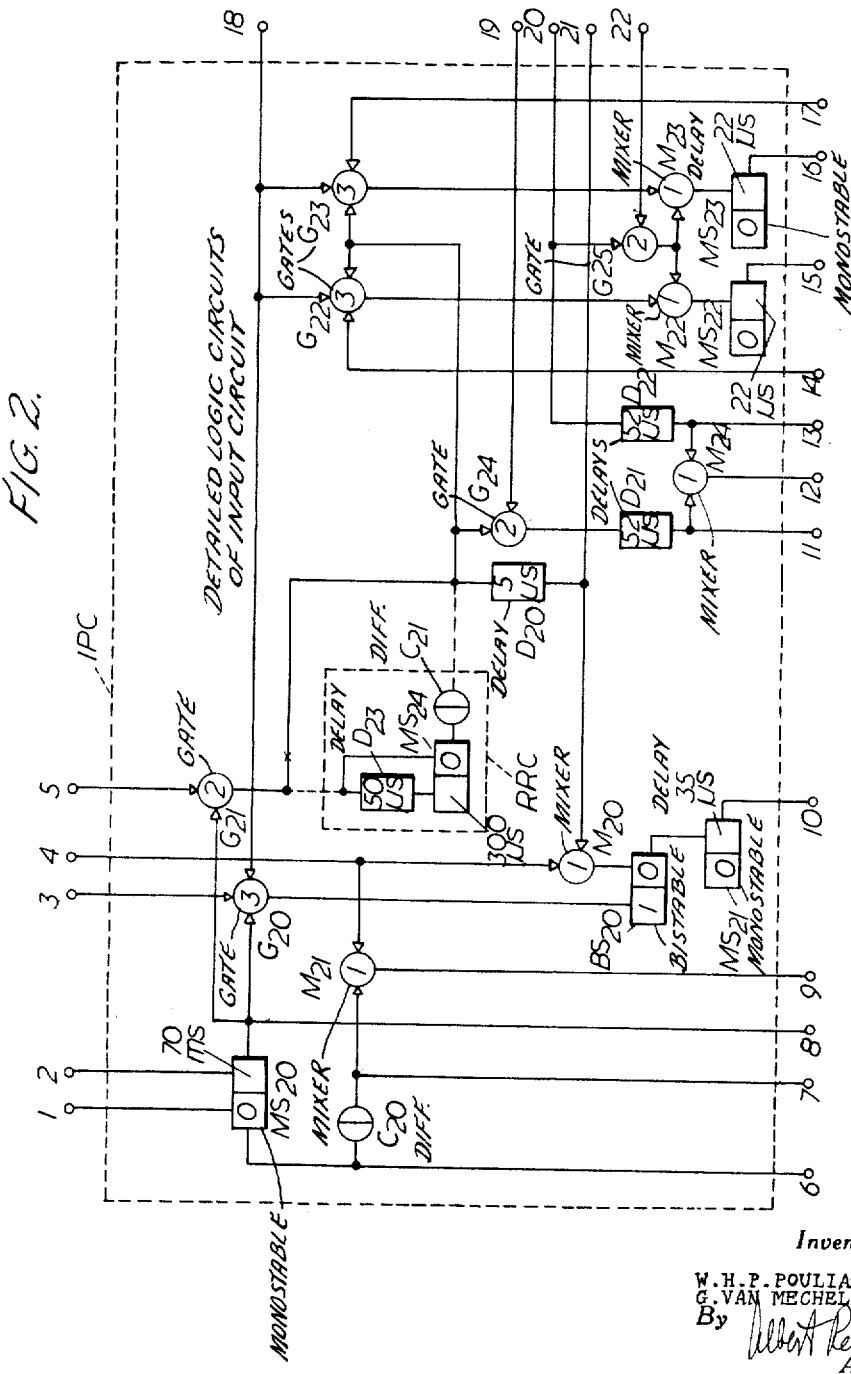

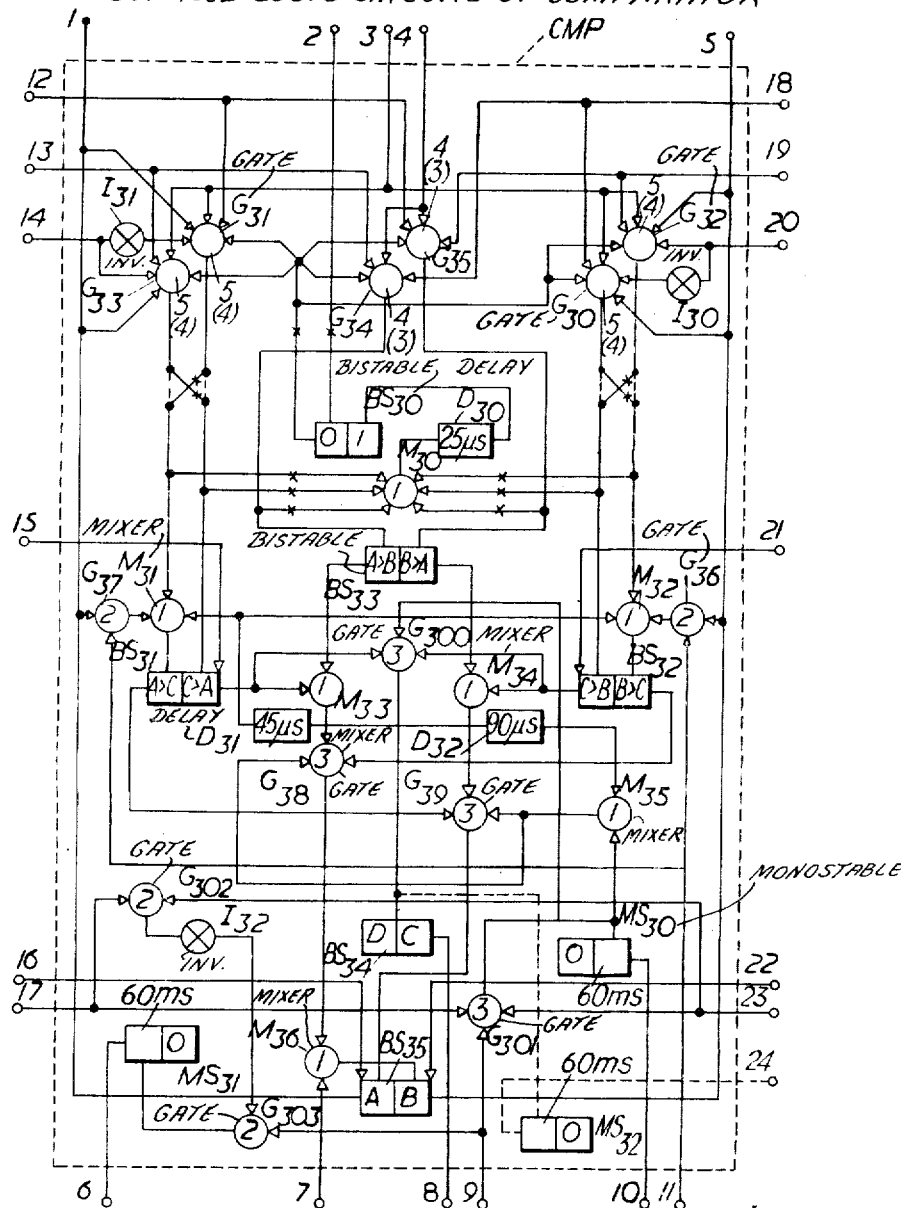

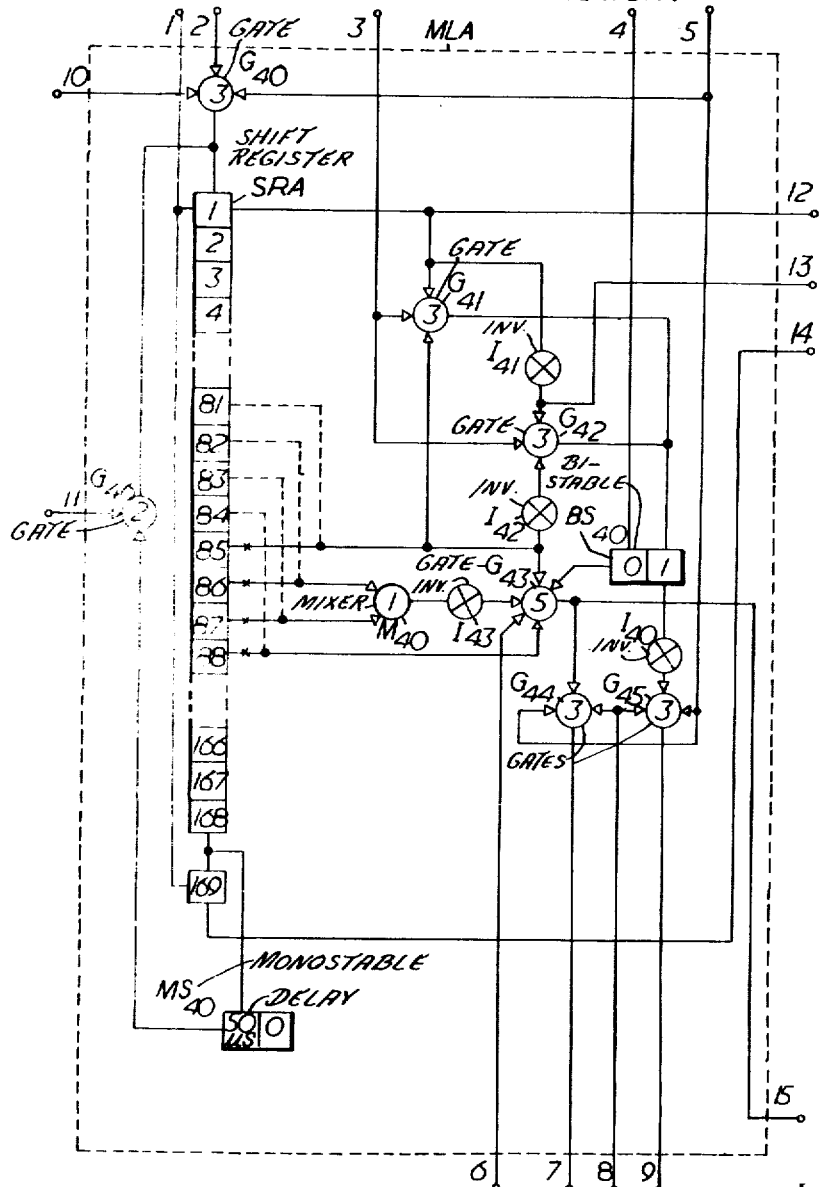

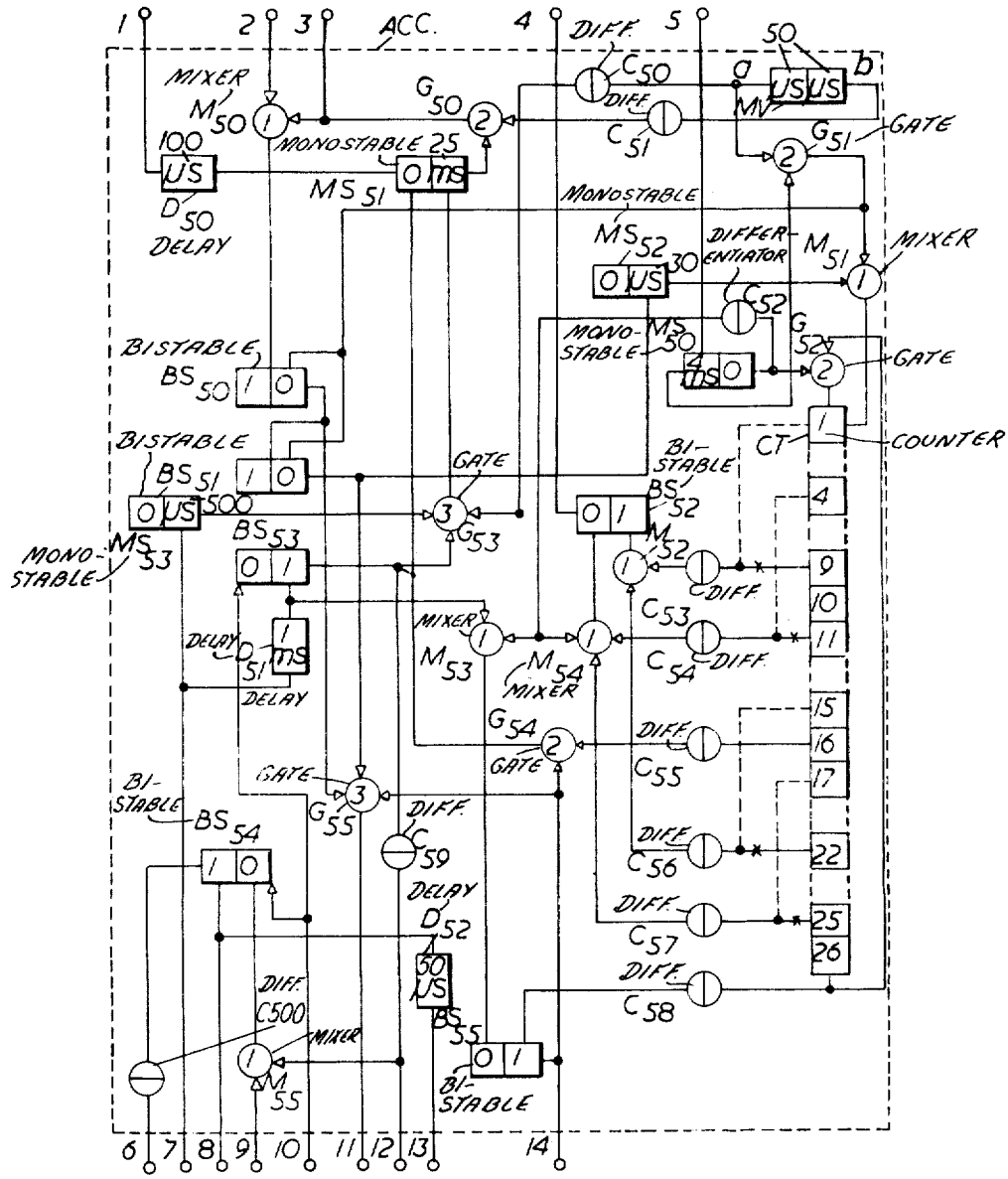

United States Patent Office 3,201,758
Patented Aug. 17, 1965

3,201,758
ELECTRICAL SORTING SYSTEM
Willy Hortense Prosper Pouliart and Guillaume van Mechelen, Antwerp, Belgium, assignors to International Standard Electric Corporation, New York, N.Y., a corporation of Delaware
Filed Apr. 13, 1959, Ser. No. 805,841
Claims priority, application Netherlands, Apr. 16, 1958, 226,874
13 Claims. (Cl. 340—172.5)

The invention relates to an electrical sorting system and more particularly to a system wherein electrically represented numbers, e.g. cheque account numbers, associated with electrically represented satellite information, e.g. cheque amounts, corresponding to physical cheque carriers to be sorted, are sorted by a binary collation process. This process consists of obtaining from a pair of initial successions of $N_1$ and $N_2$ numbers, arranged in any arbitrary order, a new pair of successions of $N_1+N_2$ numbers. This is done by merging the first sequences of numbers, ordered in the desired way, and found in each of said two initial successions to constitute the first sequence of the first new succession; the second sequences found in each of said two initial successions are merged together to constitute the first sequence of the second new succession. Similar merging operations then produce a new sequence alternatively for the first and the second new successions.

Such a system is described in U.S. application No. 635,884, filed January 23, 1957, now Patent No. 2,987,705. In this patent, electronic sorting equipment is described using shift registers, which store both the numbers to be sorted and their accompanying satellite information. In the case of cheque sorting, both the account numbers and the accompanying amounts are stored, the sorting being made in accordance with the recorded account numbers. A subsidiary sorting is automatically made for the various amounts of cheques bearing the same account number. While this subsidiary sorting is a useful feature desired by some banks, it is not an essential one and in some cases sorting in accordance with the cheque account numbers only is sufficient. Also, there may be additional satellite information which will never be used in the sorting. Hence, in some circumstances, it may be desirable to avoid the registration of the satellite information by the sorting equipment, an obvious advantage being to reduce the capacity of the shift registers which are used for controlling the sorting operations. This elimination of the satellite information is already suggested in the above mentioned U.S. application. In connection with cheque sorting with the cheques inserted in carriers bearing pieces of magnetic tape on which the numerical information is registered, it is particularly suggested to provide two parallel tapes, one recording the sorting information and the other the satellite information not required for sorting. This duplication of magnetic tapes is a source of complication since in general two magnetic head writing and reading systems will be required instead of one. Also, this procedure is not flexible since if it later appears desirable to use some of the satellite information such as the cheque amounts as sorting information, the system must be wholly redesigned.

One object of the invention is to provide a novel and simple arrangement to avoid the registration of the satellite information which is not needed for the sorting process.

Apart from the physical distinction mentioned above, that obtained by using different locations for the sorting and the satellite information, another way to make the necessary discrimination is to provide a separate input shift register which is adapted to contain only that part of the number which is relevant to the sorting process. Then, by placing undesired satellite information in front of the sorting information, the complete number may be fed serially to a buffer input shift register so that after all the digits have been received, the buffer input shift register will contain only the sorting information, the satellite information having been pushed out of the register and lost as far as the sorting equipment is concerned.

Apart from the need for an additional input shift register, this scheme, however, imposes a particular sequence for the satellite and the sorting digits.

An additional object of the invention is to avoid the registration of the satellite information not required for sorting, without imposing any restriction as to the sequence of the satellite information with respect to the sorting information. Indeed, all of the sorting and/or the satellite information digits may be interleaved with one another.

In accordance with a characteristic of the invention, an electrical sorting system as defined at the beginning of this specification, is characterised by the provision of a counter of $m$; where $m$ is the total number of binary digits needed to characterise each number, and is the sum of the $m-n$ satellite binary digits and $n$ sorting binary digits. This counter is advanced by one step as each digit of an incoming number is read into an $n$ stage input shift register and various stages of the counter are coupled to one or the other input of a bistable device so as to trigger the latter either to a first condition which prevents access of the further incoming digits to the shift register, or to a second condition which allows access of the further incoming digits to the shift register. Thus the counter and the bi-stable device may be used to discriminate between the sorting and the satellite digits and permit the sending of only the $n$ sorting digits to said shift register.

In the U.S. application referred to, two electrical shift registers are provided, each with at least $n+1$ stages, said two registers being respectively used to record a number of $n$ binary digits from the first and from the second initial succession. As a new number A from one of the initial successions is progressively inserted into one of said registers, it is serially compared digit by digit with the number C previously recorded in that register and which is now being progressively shifted out of that register. At the same time, while the new number A is inserted in the one register, it is simultaneously compared digit by digit with a number B previously recorded in the other register and which is progressively recirculated through the other register. Then, after the new number A has taken the place of the number C while the number B has returned to its initial position in the other register, means storing the results of the comparisons may be made to indicate the relative order of A, B and C. Once the relative order of the three numbers is known, the control system can transfer one of the numbers, A or B, into the first or the second new succession of numbers, the new outgoing number (C) being replaced by one (A or B) out of the initial succession of numbers from which it came.

Whenever sorting speed is at a premium, the above system in which the new number to be read is simultaneously compared both with the outgoing number and with the other number remaining in storage, is undoubtedly the most advantageous one. However, when the system is required, not merely to the sorting of numerical data, but also to control the sorting of the corresponding physical objects such as bank cheques, then the speed of the electronic control equipment is no longer so important. Indeed, even with relatively slow electronic control equipment involving for example shift registers using cold cathode tubes of the type disclosed in the U.S. Patent No. 2,649,502 by A. Odell, the slow electronic components nevertheless function very rapidly as compared to the physical movements of the articles to be sorted.

On the other hand, this simultaneous dual comparison presents a problem when it is applied to the sorting of individual documents such as cheque carriers enclosing the cheques and bearing encoded pieces of magnetic tape. These tapes bear two tracks, one being the information track and the other the synchronising track. From the latter, one will obtain as many pulses as there are binary digits. If during the reading operation, one of the synchronising pulses is missed, or alternatively if one or more spurious synchronising pulses are received, this may result in the information being wrongly positioned in the shift register. As will be described later in detail, means can be provided to detect such an incorrect registration and the corresponding cheque carrier may be eliminated from the sorting process. But this error prone series of synchronising pulses is also used to drive the other shift register so that the number stored therein is recirculated for a serial comparison with the incoming number. Consequently, if the number of synchronising pulses is not correct, after recirculation, the recirculated number will no longer be properly positioned. In rejecting the new cheque carrier the synchronizing pulses of which have not been properly read, it will therefore also be necessary to reject the cheque carrier corresponding to the recirculated number stored under the other shift register. Therefore, except in ideal conditions where there are no rejects, the simultaneous comparison scheme has the possible disadvantage of unnecessarily doubling the number of rejects.

Another object of the invention, is to compare each new number from one of the initial successions only with the outgoing number becoming part of one of the new successions; the comparison between the new number, and the number remaining in the other register being made afterwards.

In accordance with another characteristic of the invention, an electrical sorting system as defined above is characterised in that two electrical shift registers are provided each with at least $n+1$ stages where $n$ is the number of binary digits needed to characterise any number. The two registers are respectively used to store numbers from the first and from the second initial successions. As a new number A from one of said initial successions is progressively inserted into one of said registers, it is serially compared digit by digit with the number C previously stored in that register and which is progressively shifted out of said one register under the control of synchronising pulses associated with the information pulses characterising the number A. After the new number A has taken the place of the number C in the one register, the one register now containing the number A and the other register containing the number B previously recorded are both made to complete a full revolution of $n$ steps, under the control of a local source of register advancing pulses and of a counter of $n$. The $n$th stages of the registers are respectively looped to their first stages. After the comparison between the numbers A and B, the means recording the results of the comparisons may indicate the order of A, B and C, whereby in accordance with the results, the recording means cause the next number of the first or second initial successions to be serially inserted in a similiar manner into the register corresponding to the first or second initial succession while the number which is then shifted out of the corresponding register is stored as the next number of one of the new successions, also in accordance with the results.

In accordance with another characteristic of the invention, the counter of $m$ adapted to control the discrimination between the sorting and the satellite information, is also adapted to count the $n$ steps required to determine the number of local advancing pulses to be applied to both registers in order that the numbers stored therein should be simultaneously recirculated and returned to their initial positions in the respective registers.

In document sorting systems of the type discussed above, the documents are subjected to handling and must pass through various mechanisms, in particular a sorting machine. During handling and processing, the information stored on pieces of magnetic tape stuck on cheque carriers may be partially mutilated or erased. Some redundancy must therefore be included in the information, in order to provide a guard for the detection of errors in the magnetic recording due either to mutilation during handling or to a fault in the initial recording of the information.

Yet another object of the invention is to provide an electrical sorting system adapted to constantly verify that the information being used to control the sorting process is correct.

In accordance with another characteristic of the invention, an electrical sorting system of the type previously defined at the beginning of this specification is characterised in that the complement of each binary number is recorded after the recording of the normal binary form of the number. The shift registers are each provided with $2n+1$ stages, two stages of the registers being separated by $n$ intermediate stages, preferably the first and the $(n+1)$th stages, being associated with a corresponding comparator which is adapted to make a serial comparison for determining that the pairs of digits which are simultaneously read are always complementary.

The above and other objects and characteristics of the invention and the best manner of attaining them will be better understood from the following description of an embodiment of the invention to be read in conjunction with the accompanying drawings wherein:

FIG. 1 illustrates a block schematic diagram of an electronic sorting system in accordance with the invention;

FIG. 2 illustrates the detailed logical circuit of the input circuit of the system of FIG. 1;

FIG. 3 illustrates the detailed logical circuit of the comparator of the system of FIG. 1;

FIG. 4 illustrates the detailed logical circuit of the memory used in the system of FIG. 1; and FIG. 5 illustrates the logical detailed circuit of an acceptance or discriminating circuit used in the system of FIG. 1.

As shown, FIG. 1 represents an input circuit IPC adapted to receive the incoming sorting information and to provide: suitably timed pulses characterising the information, synchronising pulses, comparison pulses, starting pulses and general control pulses. This input circuit IPC is shown in detail in FIG. 2.

FIG. 1 also shows the comparator circuit CMP which is adapted to determine the order of three numbers A, B and C. The comparator circuit CMP is shown in detail in FIG. 3.

FIG. 1 also shows the memory circuits MLA and MLB which mainly comprise shift registers each capable of storing one of the numbers to be compared. The memory circuit MLA is shown in detail in FIG. 4, and the memory circuit MLB is completely identical to it.

Finally, FIG. 1 also shows the acceptance or discriminating circuit ACC, the main function of which is: to discriminate between the information which is not relevant to the sorting, and the actual sorting information; to exercise various controls particularly at the start of a sorting pass; and to read the results of the comparisons stored in the comparator circuit CMP of FIG. 3.

The system of FIG. 1 is particularly adapted to constitute the complete electronic control circuits of a sorting stage of a cheque sorting machine of the type disclosed in U.S. application No. 805,800, filed April 13, 1959, now Patent No. 3,028,958. In this machine, there are only two sorting stages each of the two-input two-output type disclosed in U.S. application No. 636,309, filed January 25, 1957, now Patent No. 3,019,896; the outputs of one stage respectively constituting the inputs of the other stage. In such a machine, cheques inserted into flat cheque carriers are subjected only to translational movements, so that while the two sorting stages looped on one another are physically identical, the control systems for each stage, including the electronic controls to be described may not be wholly identical. This will be particularly the case when fixed magnetic reading heads are used to read the cheque carriers as the latter advance. Since serial sorting is used, the digits of the cheque account numbers will, in one case, be fed to the electronic control circuits in a descending order of significance, while the reverse order will necessarily be used for the other stage. Hence, in the electronic control circuits to be described there are some slight differences according to whether control of the one or the other sorting stage is envisaged. It will be convenient to refer to the controls for one stage as the normal stage and to those for the other stage as the reverse stage. In order to clarify the difference between the reverse and normal stage, and to aid the reader in his understanding of the invention dashed lines have been added to the figures. When these lines replace those marked with an X the reverse stage may be visualized. In the normal stage, the digits will be fed in an order of descending significance, the highest significant digit being thus in front. In the reverse stage, the reverse order will be used. As explained in the U.S. application No. 636,630, filed January 28, 1957, now Patent No. 2,977,574 when the binary digits are characterised by means of a pulse for one binary digit and the absence of such a pulse for the other binary digit, an interleaved series of synchronising pulses being provided as a time base, it is advantageous that the synchronising pulses should lag, e.g. by half a period, behind the corresponding eventual information pulses. If this is adopted for the normal sorting stage, obviously the reverse order obtains for the reverse stage (that is, the synchronising pulses will lead the information pulses by half a period), but an additional circuit is provided so that the same advantages can nevertheless be readily secured. The various terminal numbers appearing in the circuit of FIG. 1 are also to be found in the corresponding detailed circuits of FIGS. 2 and 5, and in the following description the terminals will be identified by the corresponding circuit followed by the number identifying the terminal, e.g. $IPC_1$ for the first terminal of circuit IPC. Arrows have been shown to distinguish the input from the output terminals. The various logical elements to be found in the detailed circuits of FIGS. 2-5 are identified by letters indicating the nature of the element, e.g. MS for a monostable circuit, BS for a bistable circuit, G for a gate, M for a mixer, I for an inverter, C for a differentiating circuit, etc., followed by an identifying number, the first digit of which corresponds to the figure in which the element is located, e.g. gate $G_{40}$ in FIG. 4.

The electronic circuits to be described operate in conjunction with electrical control circuits which are the subject of U.S. application No. 806,025, filed April 13, 1959, now Patent No. 3,028,961. This electrical control system is particularly adapted to the control of a two-stage sorting machine described in U.S. application No. 805,800, already referred to, and uses in addition to the documents to be sorted, two special markers which are sorted together with the documents. These markers can be recognized by the electrical control circuit and they help in determining when the sorting process will be finished; since in this endless loop two-stage sorting machine, the number of sorting passes is not determined by the number of sorting stages, but merely by the original distribution of the cheques to be sorted.

In the following detailed description reference will therefore be made to some control pulses produced by the electrical control circuit of U.S. application No. 806,025 referred to in the above paragraph, as well as to outgoing signals, from the electronic circuits to be described, leading to these electrical control circuits.

A detailed description of the sorting operations will now be given. It is assumed that there are two input series of cheques which are to be sorted by a merging process, the first merged sequence from the two inputs being sent to one of the two outputs, the next merged sequence to the other output and so on until a complete sorting pass has been made. As many sorting passes are made as required to finally obtain a single output of cheques which are all sorted in accordance with their account number, it being assumed that the lowest account number must appear in front. Then if C is the account number corresponding to the cheque which was last sent to one or the other output, while A and B are the numbers of the cheques stored in the control equipment, A will be the next cheque to go out if one has $A>C>B$ or its two cyclic derivations whereas the B cheque will be the next to go out if one has $B>C>A$ or its two cyclic derivations.

Initially, the electrical control equipment (not shown) will take care of a few reset operations. In particular, an activating signal will be applied at input terminal $CMP_{16}$ to ensure that the bistable device $BS_{35}$ is in its A condition for which it applies an activating signal at output terminal $CMP_1$ to indicate that the first cheque to be advanced through the reading mechanism (not shown) should be taken from the A input group. Another reset signal will be applied at terminal $ACC_{10}$ to ensure that both the bistable devices $BS_{53}$ and $BS_{54}$ are in their zero condition at the start of the operations.

After these initial resets, the general starting pulse delivered by the electrical control equipment as each cheque is about to be read by the reading mechanism, will be issued and simultaneously applied to terminals $IPC_4$, $MLA_4$, $MLB_4$ and $ACC_5$. Thus, as the first A cheque is about to be read, the activating starting pulse at $IPC_4$ will pass through the mixer $M_{20}$ ("1" inside the circle indicating that activation of at least one input is sufficient to produce an activating output signal) to place the bistable device $BS_{20}$ in its zero condition. Through mixer $M_{21}$, this pulse will also reach the bistable device $BS_{30}$ in CMP (FIG. 3) through terminals $IPC_9$ and $CMP_2$, to set $BS_{30}$ to its zero condition. From terminal $MLA_4$, the starting pulse will be applied to the bistable device $BS_{40}$ (FIG. 4) to set it to its zero condition. The same applies to a corresponding bistable device (not shown) in unit MLB. Finally, from terminal $ACC_5$, the starting pulse reaches the monostable device $MS_{50}$ (FIG. 5) to trigger it to its unstable condition for a period of 4 milliseconds corresponding to its time constant.

When $MS_{50}$ is in its normal stable condition, it enables gate $G_{52}$ (FIG. 5) so that the output from the 26th stage of the counter CT is connected through this gate to the input of the first stage of the counter. This counter is first used to control the discrimiation of the sorting digits from the satellite digits, and thereafter to control the simultaneous application of a predetermined number of advancing pulses to the shift registers such as SRA, FIG. 4, to permit the numbers stored therein to recirculate simultaneously.

Apart from the blocking of the gate $G_{52}$, the triggering of $MS_{50}$ provides an activating signal for gate $G_{51}$ enabling the latter to pass one output of a multivibrator MV, which is a master pulse oscillator supplying 10 kc./s. square pulses of 50 microseconds duration. There are two series of complementary square pulses, i.e. the $a$ pulses applied to gate $G_{51}$ and the $b$ pulses. After passing through gate $G_{51}$ the $a$ pulses will flow through the mixer $M_{51}$ to be applied as advancing pulses to all the stages of the counter CT which may be realized as a shift register of the type disclosed in U.S. Patent No. 2,649,502 previously referred to. In such a case, the necessary power may be provided by a power amplifier (not shown) at the output of $M_{51}$. In general, it should be remarked that the detailed circuits shown do not represent shaping circuits adapted to produce the required voltage, current and power levels required since these depend essentially on the particular elements which are used. The purpose of sending about 40 advancing pulses to the counter-register CT at this stage, is to wipe out any arbitrary information pattern which might have appeared therein upon application of power. At the end of the 4 millisecond period, one will therefore ensure that all the stages of the counter-register are in the off condition. The output of $G_{51}$ is also applied to the zero inputs of the bistable devices $BS_{50}$ and $BS_{51}$ which are both arranged as scale of two counters and are connected together to constitute a binary counter of 4, which is therefore reset simultaneously with the counter CT.

When $MS_{50}$ automatically returns to its stable condition after receiving a starting pulse, the differentiator circuit $C_{52}$ produces a trigger pulse which is applied to the zero inputs of $BS_{52}$ and $BS_{55}$ through $M_{54}$ and $M_{53}$ respectively. These two bistable devices will therefore be placed in their zero condition. From $BS_{52}$ an output is obtained allowing the numerical information to be read from the incoming cheques and passed to the shift registers such as SRA. From $BS_{55}$ an inactive output signal condition is transferred to terminal $ACC_{14}$ thereby initially preventing the production of comparison pulses as described below.

It is assumed that the digits read on the piece of magnetic tape associated with each cheque carrier, number 26 decimal digits in total. For the normal sorting stage (descending order), the first two digits constitute a sorting prefix characterizing the type of cheque, e.g. travellers cheques as distinct from other cheques, which must be used during the sorting operation. The next 7 decimal digits constitute the account number which is also used in the sorting operation. The next decimal digit is a proof digit which is part of the account number but is a linear function of the first 7 digits of the latter, see U.S. Patent No. 2,911,149. This digit need not be reckoned with during the sorting process since if scanning of the two account numbers has determined which is the highest, the proof digit is superfluous as far as the comparison is concerned, and two identical account numbers must necessarily have the same proof digits. Of course, when the cheque sorting machine is adapted to cope not only with cheques with account numbers including a proof digit, but also with ordinary non-redundant account numbers, then it is preferable that the account number should be considered, as having 8 digits which must all be taken into account for the sorting process. The following digit is the sign of the amount (debit or credit for the bank) and need not influence the sorting. The next 11 digits are used for the amount of the cheque; the next 3 digits for a so-called credit item characterising the number of cheques having the same account number which may be processed together. Finally, the last, or 26th, decimal digit is an end code which, as will be described later, is utilised to verify correct positioning of the numbers in the shift registers such as SRA.

During the time $MS_{50}$ is in its unstable condition, any spurious pattern of information initially stored on the counter-shift register CT, acting as a counter is cleared out and upon $G_{52}$ being unblocked as $MS_{50}$ returns to its stable condition, this will automatically trigger the first stage of CT as will be seen. Indeed, if CT is realized as a cold cathode tube shift register of the type disclosed in the U.S. Patent No. 2,649,502, all the tubes including the last and 26th tube are now deionized and their anode outputs are high. Therefore, the signal transition resulting upon $G_{52}$ being made conductive, as in the case, for example, when $MS_{50}$ returns to normal while the anode of the 26th tube of CT is high, is used to produce a triggering signal to the first tube of CT which is therefore ionized. From that moment, the counter-register CT is ready to be stepped and accomplish its counting function.

The above operations take place as a result of a selection of the first input A cheque. $BS_{35}$ being in the A condition due to a previous reset signal at terminal $CMP_{16}$, supplies an activating signal at terminal $CMP_1$, which is used by electrical control circuits (not shown) to energize the A input. Only after $MS_{50}$ has been restored to its stable condition, will the advancing A cheque and more particularly its carrier reach the reading position. Before the magnetic tape on the cheque carrier can be read by the above-mentioned fixed reading head, the advancing carrier generates a so-called authorizing pulse by means of a photocell arrangement. Both for the A and the B input reading positions, a first photocell (not shown) is provided such that a beam of light is interrupted by the front tip of the advancing cheque carrier. For either the A or the B cheques, this gives rise to a corresponding signal which is differentiated and applied through a mixer (not shown) to terminal $IPC_2$. The advancing A cheque thereby triggers $MS_{20}$ to its unstable condition for a maximum of 70 milliseconds. As the incoming cheque continues to advance, its front tip meets a second photocell (not shown) with results similar to those described in connection with the first photocell. But this time, the mixed differentiated signal is applied to terminal $IFC_1$ to forcibly restore $MS_{20}$ to its stable condition. In this manner, $MS_{20}$ is triggered to its unstable condition before the magnetic tape, and more particularly the recorded information thereon, is read and it is restored to its normal condition after all the information on the tape has been read.

As mentioned previously, assuming that the A cheque enters the normal sorting stage with the individual information pulses leading the corresponding synchronizing pulses, an information pulse at terminal $IPC_3$ will pass through $G_{20}$ authorized by $MS_{20}$ and $BS_{52}$ and trigger $BS_{20}$ to its one condition. The subsequent synchronizing pulse will appear at terminal $IPC_5$, pass $G_{21}$ authorized by $MS_{20}$, the relay circuit $D_{20}$ of 5 microseconds, and the mixer $M_{20}$ to trigger $BS_{20}$ back to its zero condition. In this manner, $BS_{20}$ creates an output pulse which is applied to the monostable device $MS_{21}$ which contains an input differentiating circuit, $MS_{21}$ being thereby triggered to its unstable condition for 35 microseconds to provide a pulse of that length at terminal $IPC_{10}$ which is connected to terminals $MLA_2$ and $MLB_2$.

If the first digit of the A cheque corresponds to the absence of an information pulse at terminal $IPC_3$, $BS_{20}$ cannot be triggered back to its zero condition by the next synchronising pulse at terminal $IPC_5$ and consequently $MS_{21}$ will not in that case be triggered. Hence, one binary digit signal level of the first number creates a 35 microsecond pulse at terminal $IPC_{10}$, and the other binary digit signal level does not.

Before this output pulse can have any effect, the first synchronising pulse at terminal $IPC_5$ must first of all be able to supply an advancing pulse to the shift register SRA (FIG. 4) so that the previous number C stored therein can be advanced by one stage to permit the insertion of the first digit of the incoming A number. For this purpose, the undelayed synchronising pulse at the output of $G_{21}$ is applied in parallel to the gates $G_{22}$ and $G_{23}$. But, only gate $G_{22}$ is authorized by the A authorizing signal at terminal $CMP_1$ which is connected to terminal $IPC_{14}$. Therefore, the synchronising pulse will be able to pass through $G_{22}$ and $M_{22}$, to trigger $MS_{22}$ to its unstable condition thereby providing an advancing pulse of 22 microseconds duration at terminal $IPC_{15}$ which is connected to terminal $MLA_1$. The first advancing pulse will therefore shift the pattern registered on SRA by one step. At this time, the gate $G_{46}$ permitting recirculation of the number stored in SRA is blocked since terminal $MLA_{11}$ connected to terminal $IPC_6$ does not receive an activating signal while $MS_{20}$ is in its unstable condition.

As shown, SRA comprises a 169 stage shift register which may also be realized from the disclosure in U.S. Patent No. 2,649,502. The 169th stage is used to permit comparison of the incoming A number with the outgoing C number, and upon the C number having been advanced by one stage as disclosed above, the highest significant digit of the C number will be stored in stage 169. The remaining 168 stages correspond to 42 decimal digits since a binary coded decimal representation is used necessitating four binary digits per decimal digit. Any code which permits serial sorting may be used, and by way of example one may assume that the so-called Aiken code is used. This consists in allotting the five lowest 4-digit binary numbers in the ordinary 8-4-2-1 code starting with 0000, and the five highest 4-digit binary numbers in the same code ending with 1111 to the 10 decimal digits from 0 to 9 and in that order. Apart from being adapted to serial comparison, such a code has various other advantages, one of those being that the 10 code combinations form a closed group with respect to complementing, i.e. inversion of the ones into zeros and vice versa. In the circuits which are being described, it is assumed that the information corresponding to any cheque is first registered in accordance with the Aiken code, and this registration is then followed by a second complete registration of the whole number but using the inverse Aiken code, i.e. with the ones changed into zeros and vice versa. This means that for each decimal digit so inverted, the corresponding 4-digit binary number corresponds to the decimal digit which is the complement to 9 of the original decimal digit. Since a special end code is required, for positioning the information in the shift registers such as SRA this means that any of the six remaining 4-digit binary numbers which are not allotted to represent decimal digits can be used as the special end code, without any possibility of an inverted decimal digit representation coinciding with the end code. Likewise, each full number including the end code is inverted to give the second representation. Hence the inverted end code also cannot correspond to one of the decimal digits. The double serial recording of each full number in normal and inverse form, the full inverse form following the full normal form has the advantage that it is practically impossible for any error to remain undetected. This would require that if a fault causes a binary 1 to become a binary 0, some other fault would have to simultaneously transform the inverse 0 into a 1 and the chances of such complementary errors are too remote to be taken into account.

The 168 stages of the shift registers such as SRA may now be explained as comprising two sets of 84 stages one for the full number and one for the inverse full number, these 84 stage sets each accommodating 21 decimal digits. This number of 21 decimal digits is smaller than the 26 decimal digit capacity of the counter CT (FIG. 5), but one of the purposes of counter CT is precisely to be able to discriminate and feed to SRA (or SRB) only those digits of an incoming number which are to be taken into account for the sorting operation. In the present case, the first two digits constituting the sorting prefix and the following seven decimal digits of the account number are to be inserted in SRA. The next two decimal digits which correspond respectively to the proof digit and to the sign of the amount need not go into SRA. In the embodiment which is now described, the next 11 decimal digits constituting the amount will go into SRA since a subsidiary sorting in accordance with the amount is required. The next three decimal digits constituting the credit item will not go into SRA, while the last decimal digit constituting the end code must also go into SRA to insure that the latter is correctly positioned in the shift register. Altogether, there are thus 5 decimal digits out of the 26 which need not go into the shift registers and this explains the need for the number of stages in the shift registers being adapted to accommodate 21 decimal digits both in their normal and in their inverse form.

It may be remarked that if the amount digits are to be inserted in the shift registers, the economy in the number of stages for the shift registers is not very substantial percentagewise, although it becomes of the order of 50% if the subsidiary sort in accordance with the amounts is not required. But, in any event, as will be shown later, the counter CT (FIG. 5) serves another purpose which is to control the simultaneous recirculation of the two numbers stored in the shift registers SRA and SRB. The use of this counter is therefore fully justified from an economical point of view, and it affords a very flexible arrangement since the sorting information can always be selected according to the various requests of the customers.

Referring now to the storage of the incoming A number in SRA, 5 microseconds ($D_{20}$) after the start of the advancing pulse of 22 microseconds ($MS_{22}$) an input pulse of 35 microseconds ($MS_{21}$) may be applied, depending on the first binary digit of the A number, to terminal $IPC_{10}$ and from there to terminals $MLA_2$ and $MLB_2$. Since only gate $G_{40}$ in MLA is authorized by the activating signal at terminal $CMP_1$ connected to terminal $MLA_5$, and also by an activating signal at terminal $IPC_8$ connected to terminal $MLA_{10}$, this eventual input pulse at $MLA_2$ will be applied to the first stage of SRA to register therein the first and highest significant digit of the incoming A number. The delay of 5 microseconds afforded by $D_{20}$ is useful to prevent spurious delays causing the shift-register input pulse at the output of $G_{10}$ to appear before the advancing pulse at terminal $MLA_1$, since this might otherwise cause the first stage of SRA to be erroneously triggered.

The synchronising pulse delayed by 5 microseconds is not only applied to $M_{20}$ but also to terminal $IPC_{21}$ which is connected to terminal $ACC_2$ and through $M_{50}$ to the common input of the bistable device $BS_{50}$ which together with $BS_{51}$ constitutes a binary counter of 4 which is used to drive the counter CT so that the latter may count $4 \times 26 = 104$ synchronising pulses which correspond to the normal part of any incoming number. For this purpose, while the zero output of $BS_{50}$ is connected to the common input of $BS_{51}$, which common input includes a built-in differentiator circuit to permit triggering of $BS_{51}$ from the zero to the one condition upon $BS_{50}$ being triggered from the 1 to the 0 condition, the 0 output of $BS_{51}$ is in turn connected to the input of the monostable device $MS_{52}$, the output of which is connected to $M_{51}$.

Thus, upon passage of four synchronising pulses through $M_{50}$, the last of these four pulses will simultaneously condition $BS_{50}$ and $BS_{51}$ to the 0 condition, in turn producing an advancing pulse of 30 microseconds ($MS_{52}$) which through $M_{51}$ causes CT to make one step, its second stage being now activated instead of its first stage. Upon $4 \times 9 = 36$ synchronising pulses having been received, the sorting prefix and the account number forming together nine decimal digits will have been fed to SRA and it is now required to avoid sending the next two decimal digits constituting the proof digit and the sign of the amount to SRA. The counter CT will do this by producing a pulse upon its 9th stage being de-activated and this output pulse is differentiated by $C_{53}$ to produce a trigger pulse which, through $M_{52}$, will trigger $BS_{52}$ from its 0 to its 1 condition. Thus, the activating signal at terminal $ACC_4$ and consequently at terminal $IPC_{18}$ disappears with the result that the next information pulses at terminal $IPC_3$ and the next synchronising pulses at the inputs of the gates $G_{22}$ and $G_{23}$ will be unable to flow through the gates $G_{20}$ and $G_{22}$ respectively.

In such a case, when the counter CT shuts off the input pulses, the fact that it is driven through the synchronising pulses delayed by 5 microseconds ($D_{20}$) is useful since this ensures that the last advancing pulse will be generated, as gate $G_{22}$ is only blocked after the last synchronising pulse has permitted the triggering of $MS_{22}$.

Apart from controlling the production of the actual input pulses and the advancing pulses for the shift register SRA, and also the advancing pulses for the counter CT preceded by the binary counter of 4 ($BS_{50/51}$) the synchronising pulses at terminal $IPC_5$ are also applied via gate $G_{21}$ to the gate $G_{24}$ which is authorized by the activating signal produced by $BS_{55}$ (FIG. 5) in its 1 condition appearing at terminals $ACC_{14}$ and $IPC_{19}$.

However, the delay device $D_{21}$, producing the comparison pulses 52 microseconds behind the synchronising pulses at terminal $IPC_5$, will not receive the synchronising pulses at this moment since $G_{24}$ is still blocked by virtue of $BS_{55}$ being still in its zero condition. Hence, during the initial entry of the new A number into SRA, no comparison of any kind is performed.

These comparison pulses are therefore also tied to the synchronising pulses and the input scheme just described has the advantage that phase shifts between the information and the synchronising pulses read from the pieces of tape are of no consequence provided these do not exceed one period of the synchronising pulses. More details of this scheme can be obtained from U.S. application No. 806,363, filed April 14, 1959, now Patent No. 3,045,186.

For the reversed sorting stage, the eventual information pulses will now be lagging behind the synchronising pulses since the pieces of magnetic tapes are read backwards with the digits of lowest significance in front. This reversed order between the information pulses at terminal $IPC_3$ and the synchronising pulses at terminal $IPC_5$ is taken care of by means of dashed line circuit RRC in FIG. 2 the direct circuit connection between the output of $G_{21}$ and the input of $G_{24}$, being broken at the point indicated schematically by $x$. The first synchronising pulse appearing at the output of $G_{21}$ will be without effect since it will merely tend to trigger the monostable device $MS_{24}$ to its stable condition in which condition that device already stands. The first syncronising pulse will however pass through the delay device $D_{23}$ and will therefore trigger $MS_{24}$ to its unstable condition after 50 microseconds. Provided the synchronising pulses are read at such a speed that their period is at least 50 microseconds, the second synchronising pulse will trigger $MS_{24}$ back to its stable condition and in so doing will generate a pulse which will be differentiated by $C_{21}$ to provide an output synchronising pulse which is the first of the series and just as in the case of the normal sorting stage, lags behind the eventual information pulse. The first synchronising pulse at terminal $IPC_5$ is therefore ineffective, but the last synchronising pulse received at that terminal, 50 microseconds after having produced a corresponding output synchronising pulse through $C_{21}$, will trigger $MS_{24}$ to its unstable condition for the last time. Some 300 microseconds afterwards, which interval of time is the recovery time of $MS_{24}$, a last output synchronising pulse will therefore be locally generated to compensate for that which was initially lost at the beginning of the reading operation.

After the sorting prefix and the account number have been stored in SRA, upon moving from its 11th to its 12th condition, counter CT will produce a pulse which the differentiating circuit $C_{54}$ will transform into a trigger pulse reaching $BS_{52}$ through $M_{54}$ to trigger that bistable device again to its zero condition allowing the next 11 decimal digits characterising the amount of the A cheque to be inserted in SRA. When passing from its 16th to its 17th condition, the counter CT produces a pulse which is transformed into a trigger pulse by $C_{55}$ but at this time this is still without effect since gate $G_{54}$ is still blocked by the output of $BS_{55}$. On the other hand, $C_{56}$ and $C_{57}$ will respectively produce pulses which prevent the three digits of the credit item from entering SRA and then allow the end code of the A number to enter SRA as the last digit to be inserted in that shift register.

The end code, 0110, following the A number in normal form, is then registered in stages 1 to 4 of SRA, whereas the complementary end code 1001 of the C number previously stored in SRA, now occupies stages 85 to 88. In fact, this previously stored C number might only be a spurious number due to some stages of SRA having been initially triggered when the power was put on, since the present description is still concerned with the first A number being fed into SRA.

Upon counter CT leaving its 26th condition to return again to the 1st condition, a trigger pulse will appear at the output of $C_{58}$ to set $BS_{55}$ into its 1 condition producing thereby an activating condition at terminal $ACC_{14}$ and $IPC_{19}$ whereby from this moment the synchronising pulses will be admitted through $G_{24}$ to generate comparison pulses at terminal $IPC_{11}$, and also, through $M_{24}$, at terminal $IPC_{12}$. Further, $BS_{55}$ activates gate $G_{55}$ the other two inputs of which are on due to the counter of 4 ($BS_{50/51}$) being in its zero condition. Hence, an activating signal appears at terminal $ACC_{11}$ and from there is applied to terminals $MLA_{85}$ and $MLB_6$ to authorize the gates such as $G_{43}$ in MLA. The gates $G_{43}$ do not deliver an outgoing signal until the end code in normal form is stored in stages 85 to 88 of the shift register. Even then, an activating output signal from $G_{43}$ would still be without effect at this stage. The reading of the normal and the inverse forms of the input numbers is continuous and therefore, as the counter CT (FIG. 5) is stepped for its second cycle, the selected 21 inverse digits of the incoming first A number will now be progressively inserted in SRA behind the normal 21 digits. But from the moment that the first inverse digit enters, the comparison pulses produced at terminal $IPC_{11}$ and appearing at terminal $CMP_3$ will be able to initiate a comparison between the inverse form of the A number and the inverse form of whatever pattern was initially stored in SRA. In order to describe the action of the comparator CMP (FIG. 3) which is based on the one disclosed in U.S. Application No. 635,884 previously referred to, it will be assumed that the incoming A number is not the first and that therefore the inverse form of this incoming A number is compared with the inverse form of the C number being shifted out of SRA.

The comparison pulses at terminal $IPC_{11}$ ($CMP_3$) are applied to the four gates $G_{30}$ to $G_{33}$ which gates are also all controlled by $BS_{30}$ in its zero condition. The output of the first stage of SRA is connected to terminal $MLA_{12}$ and from there to terminal $CMP_{12}$, whereas the output of the 169th stage of SRA is connected to terminal $MLA_{14}$ and from there to terminal $CMP_{14}$. The complement of the signal appearing at terminal $MLA_{12}$ is obtained at terminal $MLA_{13}$ by means of the inverter $I_{41}$ and terminal $MLA_{13}$ is connected to terminal $CMP_{13}$. Likewise, the inverse of the signal appearing at terminal $CMP_{14}$ is obtained by means of the inverter $I_{31}$. The connections just described, permitting the A and the C digits to be applied to the comparator CMP are identical in the case of the information stored in the shift register (not shown) in MLB. The signal at the terminals $CMP_{12/14}$ therefore respectively correspond to those at terminals $CMP_{18/20}$.

It will be assumed that any stage of the shift register SRA, such as stage 1, delivers an activating signal if the corresponding binary digit is 0. Therefore, it will be seen that, when the inverse forms of the A and the C numbers are being compared, $G_{33}$ delivers an output signal if $C > A$, whereas $G_{31}$ delivers an output signal if $A > C$, no output signals being delivered if the digits of like rank of the two numbers are equal. Since for the normal sorting stage, the digits of higher significance appear first, as soon as the corresponding digits of A and C are not alike, one knows which of the two numbers is greater than the other and further comparisons between digits of lesser significance should not be allowed to influence the result of the A and C comparisons. Hence, as soon as a signal appears at the output of $G_{33}$ to trigger $BS_{31}$ to the condition C>A, or a signal appears at the output of $G_{31}$ to pass through $M_{31}$ and trigger $BS_{31}$ to the condition A>C, either of these signals will also pass through $M_{30}$, and delay device $D_{30}$, producing a delay of 25 microseconds, to trigger $BS_{30}$ to its 1 condition, thereby preventing the gates $G_{31}$ and $G_{33}$ from delivering further output pulses, the delay of 25 microseconds ensuring that the single output pulse obtained at the output of $G_{31}$ or $G_{33}$ does not cut itself off before it may effectively be utilized.

At the same time that the comparison between the inverse forms of the A and the C numbers takes place, the inverse A number may also be checked against its normal form the last digit of C having gone beyond stage 85 of SRA. This is obtained on the one hand by the gate $G_{41}$, connected to stages 1 and 85 of SRA, which will allow a comparison pulse at terminal $IPC_{12}$ connected to terminals $MLA_3$ and $MLB_3$, to trigger $BS_{40}$ to its 1 condition should the inverse digit and the normal digit both be equal to zero.

On the other hand, gate $G_{42}$, apart from being fed by the comparison pulses at terminal $MLA_3$, is controlled through the inverters $I_{41}$ and $I_{42}$ supplying at their outputs signals complementary to those offered to gate $G_{41}$. Hence, gate $G_{42}$ will allow a comparison pulse to trigger $BS_{40}$ to its 1 condition should the inverse A digit and the normal A digit both be equal to one. Thus, $BS_{40}$ will be triggered to its 1 condition only when the normal digit of the A number and the corresponding inverse digit are equal.

Normally therefore, after the inverse A number has been fully inserted in the first 84 stages of SRA, $BS_{40}$ will still be in its zero condition and will authorize gate $G_{43}$ which is also controlled by the signal at terminal $MLA_6$. Further, the A number has now been fully and correctly inserted to occupy the first 168 stages of SRA, the normal end code 0110 is stored in stages 85 to 88, mixer $M_{40}$ connected to the 86th and 87th stages does not deliver an activating signal whereby the inverter $I_{43}$ at its output does, and consequently $G_{43}$, further controlled by the zeros recorded in stages 85 and 88, delivers an activating signal at terminal $MLA_{15}$.

The incoming A cheque having been read, the front tip of the corresponding carrier will now pass through the second photocell arrangement to produce a trigger pulse at terminal $IPC_1$ which will restore $MS_{20}$ to its stable condition. A first effect of this is to apply an activating signal at terminal $IPC_6$ connected to terminals $MLA_{11}$ and $MLB_{11}$, thus preparing the loop gates $G_{46}$ for recirculation of numbers stored in the shift registers SRA. Another effect of the restoration of $MS_{20}$ to its stable condition is to create a pulse differentiated by $C_{20}$ to produce a trigger pulse at terminal $IPC_7$ and, through $M_{21}$, at terminal $IPC_9$.

The end of authorization pulse appearing at terminal $IPC_9$ is sent to terminal $CMP_2$ to trigger $BS_{30}$ back to its zero condition ready to allow a comparison when the next A number will be read. On the other hand, the end of authorization pulse at terminal $IPC_7$ reaches terminal $ACC_8$, to trigger $BS_{54}$ to its 1 condition, and also to be applied to the delay device $D_{52}$ so that an end of authorization pulse delayed by 50 microseconds reaches terminal $ACC_{13}$ and consequently terminals $MLA_8$ and $MLB_8$.

Upon $BS_{54}$ being triggered to its 1 condition by the pulse from $IPC_7$, $C_{500}$ generates a trigger pulse at terminal $ACC_6$ which is sent to terminal $CMP_{11}$ and from there to the gates $G_{36}$ and $G_{37}$. Since the A input is being authorized, this pulse will pass $G_{37}$ and $M_{31}$ to trigger $BS_{31}$ to the condition A>C. This happens only when the first A and B numbers are being read, since afterwards $BS_{54}$ will already be in its 1 condition when the end of authorization pulse appears at terminal $ACC_8$. Thus, whatever was the result of the comparison between the first A number and the suprious number initially stored on SRA, $BS_{31}$ will always indicate that the first incoming A number is greater than the hypothetical C number which has gone out of the shift register SRA. This measure therefore avoids the necessity for the initial reset of the shift registers such as SRA which would be particularly troublesome in the present case where the normal and the inverse numbers are stored. Indeed, such an initial reset would imply that the first 84 stages of the shift registers should record 0 while the next set of 84 stages should record 1. On the other hand, the method used provides a simple way of indicating that the first A number will have to be the first to go if it is smaller than the first B number yet to be inserted. Otherwise, without this reset of $BS_{31}$, the latter might record C>A and this might lead to the first B number being sent out first although it might be larger than the A number, i.e. if B>C. With the forced reset of $BS_{31}$ and later of $BS_{32}$, so that they indicate that the A and B numbers are both greater than the suprious C numbers which they have pushed out of the corresponding shift registers SRA and SRB, it is merely the bistable device $BS_{33}$ determining which of A and B is higher that will cause the smaller number out of A and B to be sent out in front to form the first cheque of the first outgoing sequence as required.

Before considering the effect of the end of authorization pulse, delayed by 50 microseconds and appearing at terminals $MLA_8$ and $MLB_8$, the preceding comparison operations will now be described in the case of the reverse sorting stage.

A first remark in connection with FIG. 5 is that the differentiated outputs from counter CT must now be obtained from other stages since the digits are in the reverse order. Consequently, the end code will enter first and after it has been fed to SRA, it is therefore the first stage of counter CT which must provide a pulse triggering $BS_{52}$ to its 1 condition to prevent access of the next three digits constituting the credit item to SRA. This connection of $C_{53}$ is therefore indicated in dotted lines to replace the connection from the output of stage 9. The other similar changes for the outputs of CT are also indicated in dotted lines.

Considering now FIG. 3, since the order of the digits is reversed for the reverse sorting stage, the less significant digits appear first and the bistable device $BS_{30}$ must therefore be suppressed together with $D_{30}$ and $M_{30}$ since it will be the last difference between the compared digits which will determine which of the numbers is higher. Also, it will be recalled that it is the second form of the entering number which is compared with the corresponding form of the number being pushed out of the shift register. Therefore, in the case of the reverse sorting stage, it is the normal forms of the A and C numbers which will be compared. Consequently, the outputs of the gates $G_{31}$ and $G_{33}$ should be interchanged; i.e. the dotted line connections should be used instead of those marked with the crosses applicable to the normal stage, and the same applies with respect to the outputs of the gates $G_{30}$ and $G_{32}$.

Finally, considering FIG. 4, after the incoming A number has been fully inserted in SRA in the reverse sorting stage the end code of the normal form of the A number will now be registered on stages 81 to 84 and the correct positioning of this end code must now be detected by the gate $G_{43}$ from these stages. Actually, since the order of the digits is now reversed for the reverse sorting stage, the order of the digits of the end code is also reversed but in view of the end code (0110) being symmetrical with respect to the inversion of the order of its digits, the same gating arrangement involving $M_{40}$, $I_{43}$ and $G_{43}$ can still be used with a shift of four stages in the four connections to SRA, as indicated by the crossed lines connected to the outputs of stages 85–88 of SRA.

The delayed end of authorization pulse at terminals $MLA_8$ and $MLB_8$ will be applied to the gates such as $G_{44}$ and $G_{45}$. If the first A number has been correctly positioned in SRA, these pulses will therefore flow through $G_{44}$, terminals $MLA_7$ and $ACC_7$ to trigger $MS_{53}$ into its unstable condition, so that the latter monostable device generates an output pulse of 500 microseconds. Otherwise, the pulse would instead pass through $G_{45}$, terminals $MLA_9$ and $ACC_9$ to trigger $BS_{54}$ through $M_{55}$, back to its zero condition.

This is to ensure that for very number which was badly positioned after having been entered into one of the shift registers, or which did not check with its inverse form, the next number to take its place will cause $BS_{54}$ to be triggered to its one condition, thereby triggering $BS_{31}$, to $A > C$, or $BS_{32}$ to $B > C$. The monostable device $MS_{53}$ is not triggered when such a fault occurs, and as described later, this prevents a further comparison between the faulty number and the number already stored in the other register. Further, a pulse normally produced after such a comparison will not be issued to the electrical control circuits (not shown) of the machine. A first result is that the faulty cheque is automatically ejected. A second result is that the cheque from the same input which takes its place, is assumed to have an account number larger than that of the faulty cheque due to the above mentioned reset of $BS_{31}$ or $BS_{32}$, and consequently at least this new cheque will be able to follow the direction of that cheque which immediately preceded the rejected cheque.

In other words, although the cheque following the rejected one cannot be compared with that which preceded the latter, it is assumed that its account number is larger, i.e. that the output sequence continues. This assumption may not always be true, but it is a very useful one. Indeed, if it is not true at the beginning of the sort, when the sequences are still small in size and numerous, it simply means a slightly uneven distribution of the output sequences at the sorting stage concerned, which will not materially affect the speed of the sort. On the other hand, towards the end of the sort when an input contains for example only two sequences, if a reject occurs at the junction of these two sequences, in most cases the assumption would lead to an additional sorting pass. This will certainly be the case in normal circumstances when the number of sequences in the other input at that time is a power of 2, e.g. one or two. But, when there are but few sequences, the chances that a reject will occur precisely at a sequence junction are so small that the possibility of a reject necessitating a supplementary sorting pass can be discarded.

When the monostable device $MS_{53}$ is triggered to its unstable condition, the pulse which triggers $MS_{53}$ is applied to the delay device $D_{51}$ at the output of which it appears after 1 millisecond to trigger $BS_{53}$ into its one condition. By that time $MS_{53}$ has returned to its stable condition so that there is no possibility for the gate $G_{53}$ to be unblocked to start the second comparison between the A and B sides. The output pulse produced by the triggering of $BS_{53}$ is also transformed into a trigger pulse by the differentiating circuit $C_{59}$ to be applied through $M_{55}$ to $BS_{54}$ to trigger the latter back to its zero condition. The purpose of this last triggering is to enable the second end of authorization pulse which will appear at terminal $IPC_7$ when the first B cheque is advanced, to again trigger $BS_{54}$ into its 1 condition and thereby generate a pulse at terminal $ACC_6$ which will this time be used to forcibly set $BS_{32}$ into the condition indicating $B > C$ regardless of the result of the comparison of the first incoming B number with the suprious number initially stored in the shift register SRB (not shown).

The trigger pulse at the output of $C_{59}$ is applied to terminal $ACC_{12}$ and from there to terminal $CMP_7$ to trigger $BS_{35}$ through $M_{36}$, so that this last bistable device is now set to the condition indicating the advancement of a B cheque.

It is to be remarked that the next pulse appearing at the output of $D_{51}$ will no longer be able to create a pulse at terminal $ACC_{12}$, since for this second pulse, $BS_{53}$ will already be in its 1 condition. A further effect of the pulse at the output of $D_{51}$ is to trigger $BS_{55}$ back to its zero condition thereby again preventing the generation of comparison pulses from the received synchronising pulses since $G_{24}$ is again blocked. Thus, the input circuit IPC is made ready for reading the first B cheque when the latter is actually advanced through the reading mechanism. Restoration of $BS_{55}$ to its zero condition is also useful to block gate $G_{54}$ and thereby to prevent production of a pulse $C_{55}$ as the counter CT goes through its first cycle while an A number is compared with a B number, as such a pulse would trigger $MS_{51}$ back to its stable condition, which is not yet required at that time, as the A and B comparison is still in progress.

The monostable device $MS_{51}$ is, during normal operation, triggered to its unstable condition when the 500 microsecond pulse generated by $MS_{53}$ allows a differentiated pulse at the output of $C_{50}$ to flow through $G_{53}$. This initiates a comparison between the A number stored in SRA and the B number stored in SRB, under the control of locally generated advancing pulses. But, initially, after the first A cheque has been read and the corresponding sorting information stored in SRA, the delay device $D_{51}$ prevents such a triggering of $MS_{51}$ so that an initial comparison between A and B is avoided. Indeed, this comparison could not be taken into account since if only the first A cheque has been read, whatever is in SRB is a spurious B number in general obtained during a previous sorting pass, whereby the comparison would have to be disregarded anyhow.

Since $BS_{35}$ was set to the B condition, the corresponding activating condition at terminal $CMP_5$ will now be picked up by the electrical control equipment of the sorting machine (not shown) to cause the first B cheque to be advanced and read in exactly the same way as already described for the first A cheque, except of course, that the information will be stored in MLB instead of MLA.

Thus, the end of comparison pulse delayed by 50 microseconds will pass through the gate in MLB corresponding to $G_{44}$ to terminal $MLB_7$, assuming that the B number was correctly positioned so that in MLB, the gate corresponding to $G_{43}$ produces an activating output condition. The delayed end of authorization pulse appearing at terminal $MLB_7$ will reach terminal $ACC_7$ and again trigger $MS_{53}$ to its unstable condition for 500 microseconds. But, this time, $BS_{53}$ is already in its 1 condition whereby the first $a$ trigger pulse appearing at the output of $C_{50}$ and finding the gate $G_{53}$ unblocked will trigger $MS_{51}$ to its unstable condition. This triggering will unblock $G_{50}$ with the result that the next $b$ pulse produced by the multivibrator MV, differentiated by $C_{51}$, and out of phase by a half period of 50 microseconds with respect to the triggering $a$ pulse, will be able to pass through $G_{50}$, as will all the following differentiated $b$ pulses, until $MS_{51}$ is restored to its stable condition. These pulses at the output of $G_{50}$ are applied to terminal $ACC_3$ and constitute the local synchronising pulses which will be used to simultaneously advance the A and B numbers now registered in SRA and SRB, so that these two numbers will be respectively recirculated through their loop gates such as $G_{46}$, the two numbers being compared during this recirculation operation.

The locally generated synchronising pulses at terminal $ACC_3$ are applied to terminal $IPC_{20}$ and from there to gate $G_{25}$. This is controlled from terminal $IPC_{22}$ where an activating signal is normally present. It is only in the case of the sorting machine using markers, as disclosed in U.S. Application No. 806,025 previously referred to, that the activating signal at terminal $IPC_{22}$ will eventually be suppressed upon one of the markers appearing either at the A or B input or both. In such a case, it is preferable to avoid recirculation of the other number, since the markers are recognized solely by a photocell arrangement and do not bear pieces of magnetic tapes on which some code number could be inscribed and which would need to be compared with the number on the other side. Thus, in such a case the recirculation would not serve any useful purpose and suppressing this useless operation thereby reduces the possibility of making a mistake in the recirculation of the number. The recirculation will be suppressed as long as there is a marker in one of the reading positions, each cheque on the other side being merely compared with the preceding one on that side.

Indeed, markers are initially placed behind the two input series of cheques to be sorted and upon one of the markers reaching the reading position, this is an indication that sequences of like rank on both sides can no longer be merged, and that the remaining sequences on that side having the longer number of sequences must merely be split between the two outputs. It will be noted however, that gate $G_{25}$ suppresses only the advancement of the numbers stored in the two shift registers. Local comparison pulses can still be generated by delay device $D_{22}$ and reach terminals $IPC_{13}$ and $IPC_{12}$, the latter through $M_{24}$. From terminal $IPC_{13}$, they reach $CMP_4$ where they can influence the condition of $BS_{33}$ indicating whether A is greater or smaller than B. This is however, of no consequence, since as soon as a marker is in the reading position, reset signals are applied from electrical control circuits (not shown) to the terminal $CMP_{16}$ or $CMP_{22}$, depending respectively on whether the marker has entered the reading position on the B or on the A side. These reset signals are applied at suitable times to ensure that it is the reset condition of $BS_{35}$ which will determine which input is to be advanced, i.e. the one opposite the marker.

From terminal $IPC_{12}$, the locally generated synchronising pulses reach terminals $MLA_3$ and $MLB_3$. Assuming a marker has just entered a reading position, and has generated the end of reading authorization pulse, just as a conventional carrier bearing a piece of inscribed magnetic tape, it might happen that spurious pulses are allowed to reach the input and modify the numbers registered in the two shift registers. For the number stored in the shift register corresponding to the side on which the marker has entered, this is of no consequence since that registration need no longer be used. In fact, the eventual modified number cannot be detected, since when the marker enters a reading position, a substitute activating signal is applied by the electrical circuit (not shown) at the terminals such as $MLA_{15}$, whereby the condition of $G_{43}$ and $BS_{40}$ is no longer of any importance. But, on the side opposite to the marker, if the comparison pulse applied at e.g. terminal $MLA_3$ should detect that spurious pulses have now caused the states of the first and 85th stages of SRA to be the same, $BS_{40}$ will be triggered to its one condition and the activating condition at terminal $MLA_{15}$ will therefore not be present when the comparator probe pulse is generated. The consequence of this, as will be explained later, will be that the cheque of which the number has thus been modified, will be rejected, since the stored information in SRA can not be compared with further numbers.

It may be noted that another result of the appearance of a marker in one of the reading positions will be to produce a reset signal either at terminal $CMP_{15}$ or $CMP_{21}$, depending on whether the marker has appeared on the A or on the B side. This reset action applied by the electrical control circuit (not shown) is permanent and may consist for example in disconnecting a resistance across a potentiometer resistance connected between the grid of one tube of a bistable multivibrator and the negative supply. Thereby, the effective resistance is increased, the potential at the grid increases also, the tube passes plate current, so that the bistable device $BS_{31}$ or $BS_{32}$ is triggered either to the condition $C>A$ or $C>B$. When so reset, such a bistable device may still be triggered to the other state by a comparison pulse, but it has now effectively become a monostable device as long as the reset condition persists, so that it will always automatically trigger back to it reset state in a short time determined by its time constant. As the conditions of $BS_{31}$ and $BS_{32}$ are only exploited by the probe pulse at the end of the comparison, the reset by a marker always ensures that as soon as an end of sequence is detected on the other side, the comparator will record that both A and B are smaller than C which is the condition indicating an end of sequence, causing a change of output for the cheques which continue to be delivered on the other side of the marker.

Normally, however, in the absence of a marker, the local synchronising pulse will flow through $G_{25}$ and through $M_{22}$ and $M_{23}$ to respectively trigger $MS_{22}$ and $MS_{23}$ to their unstable conditions, thereby generating at terminals $IPC_{15}$ and $IPC_{16}$ corresponding advancing pulses of 22 microseconds. These pulses are respectively applied to terminals $MLA_1$ and $MLB_1$ to drive the A and B numbers stored on SRA and SRB respectively. The recirculation of the numbers such as A is made from the 168th stage of SRA which contains the first digit of the A number, and by means of the monstable device $MS_{40}$. This device has its input connected to the output of the 168th stage of SRA, so that upon termination of the first advancing pulse at terminal $MLA_1$, an output pulse may be generated by the 168th stage depending on the nature of the binary digit initially stored in stage 168. Thus, for binary digit 1, $MS_{40}$ will be triggered to its unstable condition for 50 microseconds and the resultant output pulse will pass through $G_{46}$ to trigger the first stage of SRA and register therein the binary digit 1 previously stored in stage 168. Otherwise, no such pulse is produced whereby the first stage of SRA will now register the binary digit 0 as required.

It is to be remarked that $MS_{40}$ acts as a useful buffer circuit between the end and the beginning of SRA with the advantage that the output of $MS_{40}$, when SRA is not driven, can never be an activating condition, irrespective of the binary state of the last 168th stage of SRA. This means that when the reading authorization produced by $MS_{20}$ is cancelled by a pulse appearing at terminal $IPC_1$, the corresponding activating condition at terminal $IPC_6$, which is applied to terminals such as $MLA_{11}$ to unblock gate $G_{46}$, can never produce an undesired triggering of the first stage of SRA.

Apart from being applied to $G_{25}$, the local synchronising pulses at terminal $IPC_{20}$ are sent through the delay device $D_{22}$ to produce comparison pulses, but delayed therefrom by 52 microseconds tied to the synchronising pulses. Thus, the delay device $D_{22}$ has a function entirely analogous to that of the delay device $D_{21}$ already described in conjunction with the reading of a new cheque. The comparison pulses at the output of $D_{22}$ are again applied to terminal $IPC_{12}$ through $M_{24}$ and from there to terminals $MLA_3$ and $MLB_3$ so that they can be used to perform simultaneous comparisons between the normal and the inverse forms both for the A and B numbers. Thus, while these A and B numbers are recirculated, a continuous check will be made between their respective normal and inverse versions.

On the other hand, the comparison pulses are also applied to terminal $IPC_{13}$ which is connected to terminal $CMP_4$ connected to the gates $G_{34}$ and $G_{35}$. These two gates are part of the A and B comparator and are therefore controlled from the conditions at terminals $CMP_{12}$, $CMP_{13}$, $CMP_{18}$ and $CMP_{19}$. As for the gates $G_{31}$, $G_{33}$, $G_{30}$, $G_{32}$ part of the A and C and B and C comparators, they are also controlled from the output of $BS_{30}$ in the case of the control circuits for the normal sorting stage in which the digits are read in an order of decreasing significance with the highest significant digit in front.

As shown, $G_{34}$ will deliver an output signal when the A digit is greater than the corresponding B digit, whereas when the B digit is greater than the A digit it is $G_{35}$ which will deliver such an output signal. For the normal sorting stage it is the higher significant digits of the normal form of the A and B numbers which will be first applied to the comparator, and accordingly the output of $G_{34}$ or $G_{35}$ triggers the bistable device $BS_{33}$ into the condition indicating if A is respectively greater or smaller than B, there being no change in the state of $BS_{33}$ if A and B are alike. As for the A/C or B/C comparisons, for the normal sorting stage, $BS_{30}$ is triggered to its 1 condition as soon as a signal is delivered by $G_{34}$ or $G_{35}$ since the A/B comparison is then performed.

Contrary to the outputs of the gates such as $G_{31}$ and $G_{33}$ which must be crossed if they are used to control the reverse sorting stage, the outputs of $G_{34}$ and $G_{35}$ are applied in the same way to the inputs of $BS_{33}$ in the case of the reverse sorting stage. Indeed, in this last case, it is the lower significant digits of the inverse form of the numbers which will appear first. Therefore, the bistable device $BS_{30}$ is not used and it is the last inequality between the A and B digits which determines the final indication A>B or vice versa. Consequently, if there is a difference between any pair of A and B digits, this will last be detected from the normal forms of A and B which follow the reverse forms.

In the normal sorting stage the normal forms of the numbers A and B arrive first, so that when difference is detected, e.g. A>B, this represents the final result of the comparison, and therefore $BS_{30}$ must be used to prevent further comparison. For the reverse sorting stage, however, not only do the digits appear in ascending order of importance, i.e. least significant digit first instead of most significant digit first, as in the normal sorting stage, but also the complementary form precedes the normal form of each number. Hence, $BS_{30}$ and its associated circuitry cannot be used, since it is the last noted difference between A and B which is the significant one, and obviously if there is any difference between a pair of normal form digits, a similar difference will be found for the corresponding complementary pair of digits. Accordingly, the last difference, which will effectively indicate which of A or B is the greater, will necessarily occur for the normal form of the numbers, and as this is also the case for the first detected difference in the normal sorting stage, no reversals with respect to the triggering of $BS_{33}$ are necessary. It is merely necessary to omit $BS_{30}$ and its associated circuitry from the reverse sorting stage.

While the comparison between the two forms of A and B takes place as the two numbers are recirculated, simultaneous checks between normal and inverse forms being made in MLA and MLB, the local synchonising pulses at terminal $ACC_3$ will also be counted in ACC so that exactly 168 pulses are applied to the shift registers SRA and SRB, thereby insuring an exact repositioning of the A and B numbers as they were, prior to the recirculation.

For this purpose the counter of four, $BS_{50/51}$, and the counter of twenty-six CT will again be used. In the same way as the synchronizing pulses at terminal $ACC_2$, act through $M_{50}$, the locally generated synchronising pulses at terminal $ACC_3$ are passed through $M_{50}$ to drive both counters in cascade. As counter CT steps along, it again applies pulses to $BS_{52}$ but with no practical effect since there is no input reading authorization provided by $MS_{20}$. But, upon counter CT being triggered from its 26th to its first stage, thus after $4 \times 26 = 104$ advancing pulses have been applied to both SRA and SRB, $C_{53}$ produces a pulse to trigger $BS_{55}$ to its 1 condition, thereby unblocking $G_{54}$. While counter CT steps for the second time, upon its 16th stage triggering the 17th, $C_{55}$ will deliver a pulse which will now be able to pass through $G_{54}$ to reset $MS_{51}$ back to its stable condition. At this moment, exactly $4(26+16) = 168$ advancing pulses have been applied to SRA and SRB which means that the A and B numbers are now back in their initial positions filling the first 168 stages of the shift registers. Thus, some 30 microseconds ($MS_{52}$) after the last differentiated B pulse passes through $G_{50}$, this last gate will close preventing further advancement of the counters and the shift registers. Upon $MS_{51}$ being restored to its stable condition, this produces a suitable trigger pulse which is applied to delay device $D_{50}$, the output of which is connected to terminal $ACC_1$ which is in turn connected to terminal $CMP_9$. This pulse will be used to extract the result of the last comparisons stored on the bistable devices $BS_{31/33}$ of the comparator CMP. Since the last local synchronizing pulse to appear at terminal $ACC_3$ is responsible for producing a last comparison pulse at terminal $CMP_4$, after 52 microseconds, and since this last comparison pulse may still change the setting of $BS_{33}$ if there is a difference between the last two digits of A and B, the delay of 100 microseconds produced by $D_{50}$ ensures that the comparator probe-pulse at terminal $CMP_9$ will arrive after the comparison between A and B has been fully completed and stored on $BS_{33}$.

Assuming that the A and B numbers have both been correctly recirculated and that they were initially, before the A and B comparison, properly positioned in SRA and SRB, and assuming further that none of the bistable devices such as $BS_{40}$ have now been triggered to the 1 condition due to a disparity between normal and inverse forms of the A or B number, activating potentials will therefore be present at terminals $CMP_{17}$ and $CMP_{23}$ whereby the probe pulse at terminal $CMP_9$ will be able to pass through gate $G_{301}$ to trigger the monostable device $MS_{30}$ to its unstable condition where it will remain during 60 milliseconds. A 60 millisecond pulse will therefore be produced at terminal $CMP_{10}$ which is an indication to the electrical control circuits of the sorting machine (not shown) that the first B cheque has been properly read and compared with the A cheque, whereby the electrical control circuit can prepare the machine for the subsequent operation which will be the advancement of the second A or B cheque to the reading position. This depends on whether the result of the comparison about to be extracted from CMP will indicate that the first A number is lower or higher than the first B number and that this A or B number must respectively be advanced towards one of the two outputs of the sorting stage considered.

On the other hand, if there has been an incorrect positioning of either of the first A or B number, or a faulty comparison between their respective normal and inverse forms, at least one of the gates such as $G_{43}$ will not deliver an activating signal at terminal $CMP_{17}$ or terminal $CMP_{23}$. Consequently, gate $G_{302}$ will not deliver an output signal with the result that the inverter $I_{32}$ connected to its output will produce an output signal allowing the probe pulse at terminal $CMP_9$ to pass through $G_{303}$ instead of through $G_{301}$. In this case it is the device $MS_{31}$ which will be triggered to its unstable condition to deliver a long output pulse of 60 milliseconds duration at terminal $CMP_6$. This is also connected to the electrical control circuit of the sorting machine (not shown) so as to product an indication of the fault. Consequently, these electrical control circuits will act so as to automatically dispatch the cheques in both reading positions, not to one of the two regular outputs of the sorting stage concerned, but to a third reject output, this being automatically followed by the advancement of a new pair of cheques: first an A cheque then a B cheque as already described. Thus, the first A and B cheques are discarded. In most cases of error after recirculation, both numbers will be improperly positioned and the double reject is therefore justified, a new start being made automatically. But, the second check between the normal and inverse forms during the recirculation is an additional safeguard.

If the probe pulse at terminal $CMP_9$ is passed through $G_{301}$, apart from triggering $MS_{30}$ to its unstable condition, it will also be applied to $G_{300}$, and through $M_{35}$ to $G_{38}$ and $G_{39}$. Since $BS_{31}$ and $BS_{32}$ were respectively artificially set to the conditions indicating $A>C$, and $B>C$, $G_{300}$ cannot allow the first probe pulse to pass, such passage being permitted only for subsequent probe pulses and then only if both A and B are smaller than C. In such a case, the end of an output sequence has necessarily been reached and $G_{300}$ therefore allows the probe pulse to trigger $BS_{34}$ which is a bistable device with a common input and is used to determine to which output (C or D) the outgoing cheque should be directed.

In the present case (first two cheques) if $A>B$, $BS_{33}$ authorizes, through $M_{34}$, the probe pulse to pass through $G_{38}$. On the contrary, if $B>A$, through $M_{34}$, $BS_{33}$ authorizes the probe pulse to pass through $G_{39}$. In the first case, the probe pulse at the output of $G_{38}$ will pass through $M_{36}$ to trigger $BS_{35}$ to the B condition to indicate that the first B cheque is the first to go out of the sorting stage concerned since it is the smaller of the two, the next B cheque taking its place. In the second case, the probe pulse at the output of $G_{39}$ will be applied to the A input of $BS_{35}$ which will therefore be triggered to the A condition to indicate that it is the first A cheque which, being the smaller of the two, should be sent out of the sorting stage concerned, the next A cheque being advanced through the reading mechanism to take its place.

In the case of this first comparison between the first A and B numbers, both A and B were necessarily made to be greater than C whereby there could be no change of output. If there is to be a change of output at the end of the sequence, the probe pulse at the output of $G_{300}$, apart from changing the state of $BS_{34}$ will be applied in parallel to the delay devices $D_{31}$ and $D_{32}$. The first produces a probe pulse delayed by 45 microseconds to avoid a premature effect since it is used to reset $BS_{31}$ and $BS_{32}$ respectively through $M_{31}$ and $M_{32}$ to the conditions corresponding to $A>C$ and $B>C$. This destruction of part of the actual results of a comparison is now permissible, since both the A and B cheques standing in the reading positions of the sorting stage considered are smaller than the last cheque which went out of this sorting stage and consequently apart from the change of output, it is only necessary to know which of A or B is the smallest so that the corresponding cheque can be made to advance first out of the sorting stage to start a new output sequence. Hence, the probe pulse delayed by 90 microseconds by $D_{32}$ will be applied to $G_{38}$ and $G_{39}$, through $M_{35}$, which two gates are controlled by $BS_{33}$ so that $BS_{35}$ may be set to the required condition indicating which of A or B is smaller.

The last of the possible results of a normal comparison is that C has a value intermediate between A and B. In such a case, it is the number higher than C which must be advanced out of the sorting stage since it can still continue the sequence which includes C. If $BS_{31}$ indicates $A>C$ while $BS_{32}$ indicates $C>B$, the probe pulse will be able to pass through $G_{39}$ as required, while in the reversed case, it would pass through $G_{38}$, in each case setting $BS_{35}$ to the required condition.

In the case of the reverse sorting stage, yet another effect of the output pulse appearing at the output of $G_{300}$ is to trigger the monostable device $MS_{32}$ producing a long duration pulse of 60 milliseconds at terminal $CMP_{24}$. This may be used by the electrical control circuits (not shown) to count the number of output sequences produced by a sorting stage during a sorting pass. Such a sequence counter is disclosed in U.S. application No. 806,025 previously referred to. It is particularly useful in such a machine to foresee when the sorting operation is about to be ended.

The first A and B cheques having been properly processed, the second A or B cheque will now be advanced through the reading position and will be read in the same way as previously described. However, the end of the authorization pulse appearing at terminals $IPC_7$ and $ACC_8$ will not be able to change the condition of $BS_{54}$ since this bistable device did not receive a pulse to trigger it into its zero condition after the first B cheque had been found properly positioned. Indeed, when the first B cheque causes a pulse to appear at terminal $ACC_7$, the corresponding pulse at the output of $D_{51}$ cannot change the setting of $BS_{53}$ which was already in its 1 condition. Hence, $C_{59}$ cannot apply a trigger pulse through $M_{55}$ to trigger $BS_{54}$ into its zero condition. Consequently, the end of authorization pulse for the third cheque at terminal $ACC_8$ will not produce a pulse at terminal $ACC_6$ to reset either $BS_{31}$ or $BS_{32}$ to the condition indicating $A>C$, or $B>C$. Hence, the state of $BS_{31}$ or $BS_{32}$ after a third cheque has been compared with the outgoing first A or B cheque will determine the result of the comparison as recorded.

The only case where such a reset of $BS_{31}$ or $BS_{32}$ will still be made apart from the resets made for the first two cheques, will happen upon a cheque having been found incorrect or not properly positioned. In such a case, the delayed end of authorization pulse at terminal such as $MLA_8$ will reappear at terminal $MLA_9$ and be sent through terminal $ACC_9$ to trigger $BS_{54}$ to its zero condition through $M_{55}$. The cheque which caused this triggering will be rejected as explained before and a new cheque will take its place. Therefore, after this new cheque is read, the end of authorization pulse at terminal $ACC_8$ will produce a resetting pulse at terminal $ACC_6$ which will ensure that the setting of $BS_{31}$ or $BS_{32}$ will be placed artificially on $A>C$ or $B>C$. Thus, as required, the previous comparison which was made as the faulty cheque information was entered into the shift register is disregarded. This means, as previously discussed, that the cheque replacing the faulty one is assumed to be larger than the one which preceded the faulty one on the same side.

Also, this reset of $BS_{31}$ or $BS_{32}$ will occur if a double reject is necessary after a recirculation and comparison of A and B numbers. In such a case, it will be recalled that monostable device $MS_{31}$ is triggered instead of monostable device $MS_{30}$ and the corresponding signal at terminal $CMP_6$ reaching the electrical control circuits (not shown) will initiate reset actions in the latter. This reset action in the electrical control circuit is analogous to a new start, with the result that a reset signal will be applied from the electrical control circuit to terminal $ACC_{10}$ thereby causing $BS_{53}$ and $BS_{54}$ to be reset to their zero conditions.

It will be appreciated that bistable devices $BS_{53}$ and $BS_{54}$ together with the associated circuitry, afford a particularly simple way of starting the sorting operation, i.e. by first advancing an A number and then a B number, without regard to the conditions of the bistable devices, such as $BS_{31}$, which store the results of the comparison between the new number entered in the shift register such as SRA and the number which is shifted out of that register. In this manner, the shift registers such as SRA need not be made to record zero numbers at the beginning of the sorting operation, which is particularly advantageous, as pointed out previously, in the case where the numbers are recorded in duplicate form and where the forms of the numbers are complementary.

Finally, it will be observed that only single inputs from the magnetic reading heads have been shown, no switching at the input being required to read alternatively the A or the B input number. This absence of switching at the input has been made possible by connecting the respective magnetic heads for the two input sides, both for the magnetic heads reading the synchronising signals and the magnetic heads reading the information signals, in series with one another, noting that the A and B cheque jacket are never read simultaneously. In this manner, leads from the magnetic reading heads need not be passed through authorizing electrical contacts or gates controlled by the setting of the master bistable circuit $BS_{35}$. This will be particularly advantageous in a document sorting machine where the magnetic reading heads will generally be located at some physical distance from the electrical and electronic control circuits for the sorting stage concerned. Hence, these leads would have to be rather long and somewhat elaborate precautions would have to be taken against the picking up of spurious signals which may readily occur especially as somewhat heavy electromagnets are generally needed for the control of the advancement of the documents.

While the principles of the invention have been described above in connection with specific apparatus, it is to be clearly understood that this description is made only by way of example and not as a limitation on the scope of the invention.

We claim:

1. An electrical sorting circuit, to be used in conjunction with a record sorting system which utilizes a binary collation process, into which binary signals are fed representing sorting and satellite numbers on record carriers comprising: information signal gating means, a counter of $m$ stages where $m$ is the total number of binary digits necessary to characterize the sorting and satellite numbers; means for advancing said counter one step for each digit of an incoming number; a bistable device operable to one stable state by any one of several of said counter stages and to the other stable state by any one of several others of said counter stages associated respectively with corresponding ones of said first mentioned several stages; and at least one output control lead connected between said bistable device and said information signal gating means whereby a discrimination between sorting and satellite information is effected.

2. An electrical sorting circuit, as claimed in claim 1, in which the counter comprises a binary counter of four; and a ring counter, having as many stages as there are decimal digits in the sorting and satellite numbers, said counter of four having an input coupled to the means for advancing said counter and having an output coupled to said ring counter.

3. An electrical sorting circuit, as claimed in claim 1, further comprising means for resetting the counter prior to insertion of each new incoming number in one of the shift registers.

4. An electrical sorting circuit, as claimed in claim 3, in which the means for resetting the counter comprises a source of pulses; a gate circuit coupled between said source of pulses and the counter; a monostable device coupled to said gate circuit; and means operative in response to an initial incoming number and thereafter inoperative, for setting said monostable device to its unstable state whereby a predetermined number of pulses from said source are connected through to the counter.

5. An electrical sorting circuit, to be used in conjunction with a record sorting system which utilizes the binary collation process, into which binary signals are fed representing sorting and satellite numbers on record carriers comprising: two shift registers each having at least $2n+1$ stages where $n$ is the number of binary digits needed for sorting a record, the $2n$th stages of said registers being respectively looped to the first; means connected to said registers for progressively shifting relevant sorting numbers from respective first and second initial successions of numbers into said two registers; individual gate means coupled to each of said registers for comparing a new number A from one of said initial successions, as it is progressively recorded in one of said registers, with the number C previously recorded in that register being progressively shifted out of this register; means for cycling both said registers after recording of a number in one of said registers; further gate means coupled to both said registers for comparing the new number A in one register and the number B in the other register during cycling of said registers; and means for storing the results of the comparisons.

6. An electrical sorting circuit, as claimed in claim 5, in which the means for cycling both said registers comprises: a local source of register advancing pulses; and a counter-of-$m$, where $2n>m>n$, coupled to said source of advancing pulses for controlling the number thereof.

7. An electrical sorting circuit, as claimed in claim 5, in which the means for storing the results of the comparisons comprise three bistable devices, two respective ones of said bistable devices being coupled to the individual gate means and the third being coupled to the further gate means.

8. An electrical sorting circuit, as claimed in claim 5, further comprising a bistable device coupled to all of the mentioned gate means for enabling said gate means in one stable state thereof whereby disparity between digits of like rank of two compared numbers forces the said bistable device to assume the opposite of said one stable state; and means coupled to said bistable device and responsive to said opposite state for preventing the recording in the register of further disparities.

9. An electrical sorting circuit, to be used in conjunction with a record sorting system which utilizes the binary collation process, into which first the normal form of a binary signal train $n$ digits in length, and then the inverse or complementary form of the same binary signal train are fed representing sorting and satellite numbers on record carriers comprising: two electrical shift registers each of at least $2n+1$ stages; means for progressively recording different ones of said $n$ digit signals trains in each of said registers; comparing means for each register coupled between the first and the $(n+1)$th stages thereof for detecting an error between the normal and complementary forms of the said signal trains applied to the respective registers, and common comparing means coupled to both of said registers for comparing the signal trains stored therein.

10. An electrical sorting circuit to be used in conjunction with a record sorting system which utilizes the binary collation process, into which binary and their inverse or complementary binary signals are fed representing sorting and satellite numbers on record carriers comprising: two shift registers each having at least $2n+1$ stages where $n$ is the number of binary signals necessary to characterize a record, the $(2n)$th stages of said registers being respectively looped to the first; means for progressively storing a new number A in one of said registers, while a previously stored number C is progressively turned out of this register; means for serially comparing the new number A with the old number C as it is turned out of the register; means operative after the said comparison of the numbers A and C for comparing the number A with a number B previously stored in the other register; and means for comparing the normal and complementary forms of said numbers during the above mentioned comparisons.

11. An electrical sorting circuit, as claimed in claim 10, further comprising means coupled to the normal and complementary form comparing means, and responsive to a disparity for rejecting the faulty number and indicating a continuation of sequence.

12. An electrical sorting circuit for a record sorting system which utilizes a binary collation process, in which binary signals are fed, in normal and inverse form, representing sorting and satellite numbers on record carriers and in which an end code is sent indicating the conclusion of the normal form of the binary signals comprising: two shift registers each having at least $2n+1$ stages where $n$ is the number of binary digits needed to characterize the number and the end code; means connected to said registers for progressively shifting numbers from first and second initial successions into said two registers respectively; end code responsive means coupled to a number of successive stages of each register, the number of successive stages being equal to the number of binary digits representing a predetermined end code, the end code responsive means providing an indication as to whether the number is correctly positioned in the register; and means responsive to an incorrect positioning of the end code for rejecting the number and for initiating a continuation of sequence.

13. In an electrical sorting system, requiring selection vertification and comparison of predetermined portions of various information signal trains, a control arrangement comprising an $m$ state counter, first and second sources of information signal trains each $2m$ units in length and each comprising $m$ units of intelligence in a first form, and $m$ units of the same intelligence in a second form for the purpose of verification, the said $m$ units of intelligence including a proper subgroup of $n$ sorting intelligence units, first and second shift registers associated with said first and second respective sources, said registers each having $2n+1$ stages for storing the said sorting intelligence units in both said first and second forms thereof, gating means for transferring signal trains from either of said sources to a selected one of said shift registers, means coupled to the said $m$ state counter, said gating means, and said shift registers for channeling the first and second forms of the $n$ sorting intelligence signal units in one of the said $m$ unit trains to one of said shift registers while the said counter cycles through $2m$ states, said gating means being operative in respect to predetermined outputs of said counter to prevent the passage of information signals to said one of said shift register, said predetermined outputs of said counter being selected in accordance with the positions within said information trains of the $m-n$ non-sorting intelligence units, so that only the first and second forms of said $n$ sorting intelligence units is ultimately stored in said one of said shift registers, means operative following the insertion of said first and second forms of said $m$ sorting intelligence units into said one of said shift registers for advancing said counter through $2n$ steps and for thereafter resetting said counter to its initial state, and means operative during the advancement of said counter through said $2n$ steps for concurrently recirculating the intelligence stored in both of said shift registers.

References Cited by the Examiner
UNITED STATES PATENTS

| | | | |
|---|---|---|---|
| 2,911,622 | 11/59 | Ayres | 340—172.5 |
| 2,961,643 | 11/60 | Ayres | 340—172.5 |

MALCOLM A. MORRISON, *Primary Examiner.*

LEO W. QUACKENBUSH, IRVING L. SRAGOW,
*Examiners.*